United States Patent [19]

Hayashi

[11] 4,174,079
[45] Nov. 13, 1979

[54] METHOD OF DETECTING TAPE TRANSPORT CONDITION

[75] Inventor: Kiyoshi Hayashi, Nagoya, Japan

[73] Assignee: Shin-Shirasuna Electric Corp., Aichi, Japan

[21] Appl. No.: 770,414

[22] Filed: Feb. 22, 1977

[30] Foreign Application Priority Data

Feb. 24, 1976 [JP] Japan .................................. 51/19143

[51] Int. Cl.² ............................................. G11B 15/32
[52] U.S. Cl. .................................... 242/186; 318/314; 318/318
[58] Field of Search ........................ 318/6, 7, 314, 318; 242/191, 186, 75.5; 331/4, 64; 324/166, 83 R, 83 A, 83 D, 83 Q, 83 FE

[56] References Cited

U.S. PATENT DOCUMENTS

| 3,647,157 | 3/1972 | Chitty | 242/191 |
| 3,695,550 | 10/1972 | Lennox | 242/191 |
| 3,908,167 | 9/1975 | Hulls et al. | 324/166 |
| 3,922,602 | 11/1975 | Lunquist | 331/64 |
| 3,982,190 | 9/1976 | Schaefer | 324/83 D |
| 4,031,466 | 6/1977 | Krause et al. | 324/166 |

Primary Examiner—Gene Z. Rubinson
Assistant Examiner—Eugene S. Indyk

[57] ABSTRACT

A method of detecting tape transport condition, wherein a signal is derived from detector means provided in association with at least one of a pair of spindle reels of a tape recorder to detect the rate of revolution of said spindle, said signal having a frequency proportional to the rate of revolution of said spindle. The signal derived from the detector means is applied to a phase-locked loop, and it is also applied to a synchronism detecting circuit, together with a signal derived from a voltage-controlled oscillator contained in said phase-locked loop. Thus, detection is made with respect to whether or not these two signals agree in frequency with each other.

4 Claims, 1 Drawing Figure

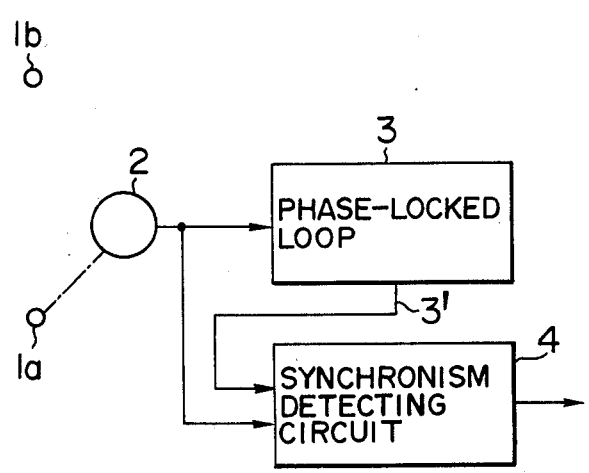

METHOD OF DETECTING TAPE TRANSPORT CONDITION

This invention relates to a method of detecting tape transport condition.

In tape recorders, there has heretofore been proposed and practically used a method of detecting the completion of winding-up of a tape on the basis of interruption of an electric signal derived from detector means provided in association with a reel spindle. With such a conventional method, however, it is not possible, in case the reel spindle is being idly rotated due to severance of the tape, to detect such a case.

Accordingly, it is an object of this invention to provide a method capable of achieving the desired detection not only when a tape is fully wound up but also when the tape is severed.

Another object of this invention is to provide a method of making it possible, in case the tape is fully wound up or in case the tape is severed, to detect such a case, and causing a tape recorder to be shut off on the basis of the detection.

Other objects, features and advantages of this invention will become apparent from the following description taken in conjunction with the accompanying drawing.

The drawing shows an example of the circuit arrangement designed to carry out the method of this invention.

Referring to the drawing, designated by 1a and 1b respectively are a take-up reel spindle and supply reel spindle on which reels (not shown) are mounted respectively so that a tape is transported from one to the other of the reels. The take-up reel spindle 1a is associated, either directly or through rotation transmitting means such as a belt or the like, with detector means 2 such as a frequency generator which is so designed as to detect the rate of revolution of the reel spindle and generate a signal having a frequency proportional to such a rate of revolution. The detector means may be associated with the supply reel spindle 1b rather than the take-up reel spindle 1a. Alternatively, two detector means may be provided in association with the reel spindles 1a and 1b respectively. The output of the detector means 2 is coupled to the input terminal of a phase-locked loop 3 containing a voltagecontrolled oscillator and also to one input terminal of synchronism detecting circuit 4. The phase-locked loop 3 has a so-called lock range which is previously set so as to cover the rotational speed range of the reel spindle as the tape is transported at its steady speed. One output terminal 3' of the phase-locked loop 3 is connected with the other input terminal of the synchronism detecting circuit 4. Derived from the output terminal 3' of the phase-locked loop 3 is a signal which has a frequency identical with that of the signal derived from the detector means when the frequency of the signal from the detector means is within the aforementioned lock range, and a phase which is shifted from a phase shifted by 90° from that of the signal derived from the detector means, by an amount proportional to the difference between the frequency of the signal obtained from the detector means and the free-running frequency of the voltage-controlled oscillator contained in the phase-locked loop 3. Thus, the signal derived from the phase-locked loop 3 and that from the detector means 2 are applied to the two input terminals of the synchronism detecting circuit 4, respectively.

Description will now be made of the operation of the above-described circuit arrangement capable of carrying out the method of this invention.

Assume that the reel spindle 1a is being rotated at a predetermined speed so that the tape is being normally transported. Then, the signal from the detector means 2 and that from the voltage-controlled oscillator contained in the phase-locked loop 3 are applied to the input terminals of the synchronism detecting circuit 4, respectively. In this case, the signal from the detector means 2 and that from the voltage-controlled oscillator contained in the phase-locked loop 3 are supplied to the two input terminals of the synchronism detecting circuit 4, respectively. In this case, since the signal from the detector means 2 and that from the voltage-controlled oscillator agree in frequency with each other, the synchronism detecting circuit 4 provides an output by which it is possible to detect that the tape is being normally transported; in such a case, of course, an automatic shut-off device which may be incorporated in the tape recorder will not be operated.

When the tape has been fully wound up, the reel spindle is prevented from rotation so that no signal is available from the detector means 2 and thus only the free-running frequency output of the voltage-controlled oscillator contained in the phase-locked loop 3 is applied to the synchronism detecting circuit 4 so that the latter will provide no output. In this way, it is possible to detect that the tape has been fully wound up. If desired, the automatic shut-off device may be thereby operated so as to cause the tape recorder to be shut off.

In case the tape speed is reduced by a frictional force being applied to the tape due to some cause, the frequency of the signal from the detector means 2 will be substantially decreased so as to be deviated from the lock range of the phase-locked loop 3 so that the voltage-controlled oscillator contained in the phase-locked loop 3 will not follow the signal from the detector means, and as a result, two signals which are out of synchronism with each other will be applied to the two input terminals of the synchronism detecting circuit 4 respectively, so that the circuit 4 will provide no output. Thus, it is possible to detect than an abnormal condition has occurred in the transport of the tape. Likewise, the automatic shut-off device may also be operated.

In case the reel spindle begins to be rotated at a high speed due to the fact that the tape is severed or the end of the tape is disconnected from the reel, then the frequency of the signal from the detector means 2 will be increased proportionally to the rotational speed of the reel spindle so as to be deviated from the lock range of the phase-locked loop 3. Thus, two signals which are different in frequency from each other will be provided to the two input terminals of the synchronism detecting circuit 4 respectively, so that the latter will provide no output. In this way, it is possible to detect that the abnormal condition has occurred in the transport of the tape, and the automatic shut-off device may also be operated.

As will be appreciated from what has been described above, in accordance with this invention, it is possible, in all cases, to positively detect whether the tape transport condition is normal or abnormal. In addition, it is also possible to cause the tape recorder to be automatically shut off on the basis of the detection. And yet these effects can be produced with a greatly simplified circuit arrangement.

Although, in the foregoing, description has been made of the case where this invention is applied to a cassette tape recorder, it will readily be apparent to those skilled in the art that this invention is equally applicable to an open reel type tape recorder.

It is to be understood that the foregoing description is only exemplary of the invention and various modifications and changes may be made therein within the spirit and scope of the invention as defined in the appended claims.

What is claimed is:

1. A method of detecting tape transport condition, which comprises deriving a signal from detector means provided in association with at least one of a pair of reel spindles to detect the rate of revolution of said reel spindle, said signal having a frequency proportional to said rate of revolution, applying said signal to a phase-locked loop having a lock range which is previously set so as to cover the rotational speed range of said reel spindle as the tape is being transported at a predetermined steady speed, applying to a synchronism detecting circuit said signal derived from said detector means and a signal derived from a voltage-controlled oscillator contained in said phase-locked loop, and detecting whether or not said two signals agree in frequency with each other.

2. A method according to claim 1, wherein said detector means is associated with the take-up reel spindle of a tape recorder.

3. A method according to claim 1, wherein said detector means is associated with the supply reel spindle of a tape recorder.

4. A method according to claim 1, wherein use is made two detector means provided in association with the take-up and supply reel spindles of a tape recorder respectively.

* * * * *